Dec. 10, 1946.  M. W. GREEN  2,412,331
TRANSMISSION
Filed March 31, 1945   3 Sheets-Sheet 1

INVENTOR.
Maurice W. Green.

Dec. 10, 1946.　　　M. W. GREEN　　　2,412,331
TRANSMISSION
Filed March 31, 1945　　　3 Sheets-Sheet 2

INVENTOR.
Maurice W. Green

INVENTOR.
Maurice W. Green

Patented Dec. 10, 1946

2,412,331

UNITED STATES PATENT OFFICE 2,412,331

TRANSMISSION

Maurice W. Green, South Bend, Ind., assignor to Bendix Home Appliances, Inc., South Bend, Ind., a corporation of Delaware Application March 31, 1945, Serial No. 585,947

7 Claims. (Cl. 74—368)

1

This invention relates to transmissions and the mechanism used for illustration is a two-speed transmission designed for use with a domestic washing machine having a washing container rotating continuously in a single direction but at one speed for washing and another higher speed for a centrifugal drying operation.

It is a primary object of the invention to provide a transmission with means to change the gear ratio wherein such gear ratio change is not primarily dependent upon relative sliding of gear teeth for effecting gear ratio change and wherein relative sliding of gear teeth on gears while under driving load will be unnecessary.

The above and other objects of the invention will appear more fully from the following detailed description and by reference to the accompanying drawings forming a part hereof and wherein.

Figure 8:
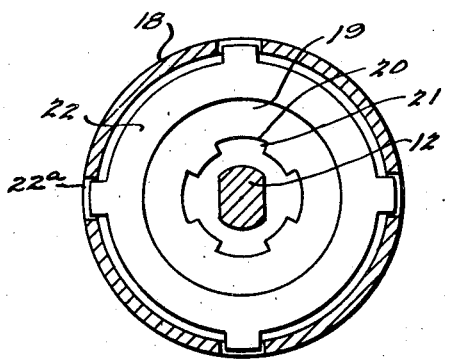
Figure 8 is a sectional view through the clutch taken on the line 8—8 of Figure 1.
Figure 7:
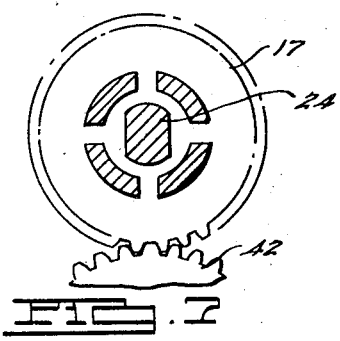
Figure 7 is a sectional view on the line 7—7 of Figure 1.

Referring to the drawings, the transmission is carried in a housing 10 which in the preferred embodiment shown is designed to be attached to an electric motor housing. A power or drive shaft 11 which may be a motor shaft or other shaft connected to power means has a projecting end portion 12 preferably of flat side configuration at its end (see Figures 1 and 8). Such a shape enables the end 12 of the shaft 11 to be slidably but non-rotatably connected to a clutch member 13 and a sleeve 14, the center opening in the sleeve 14 and the clutch member 13 being of such shape as to allow sliding movement of the projecting end 12 in sleeve 14 when pushed by an abutment 15 carried on the shaft 11, a spring 16 being interposed between the end of the sleeve 14 and the clutch member 13. It is apparent that the sleeve 14 and clutch member

2

Figure 1:
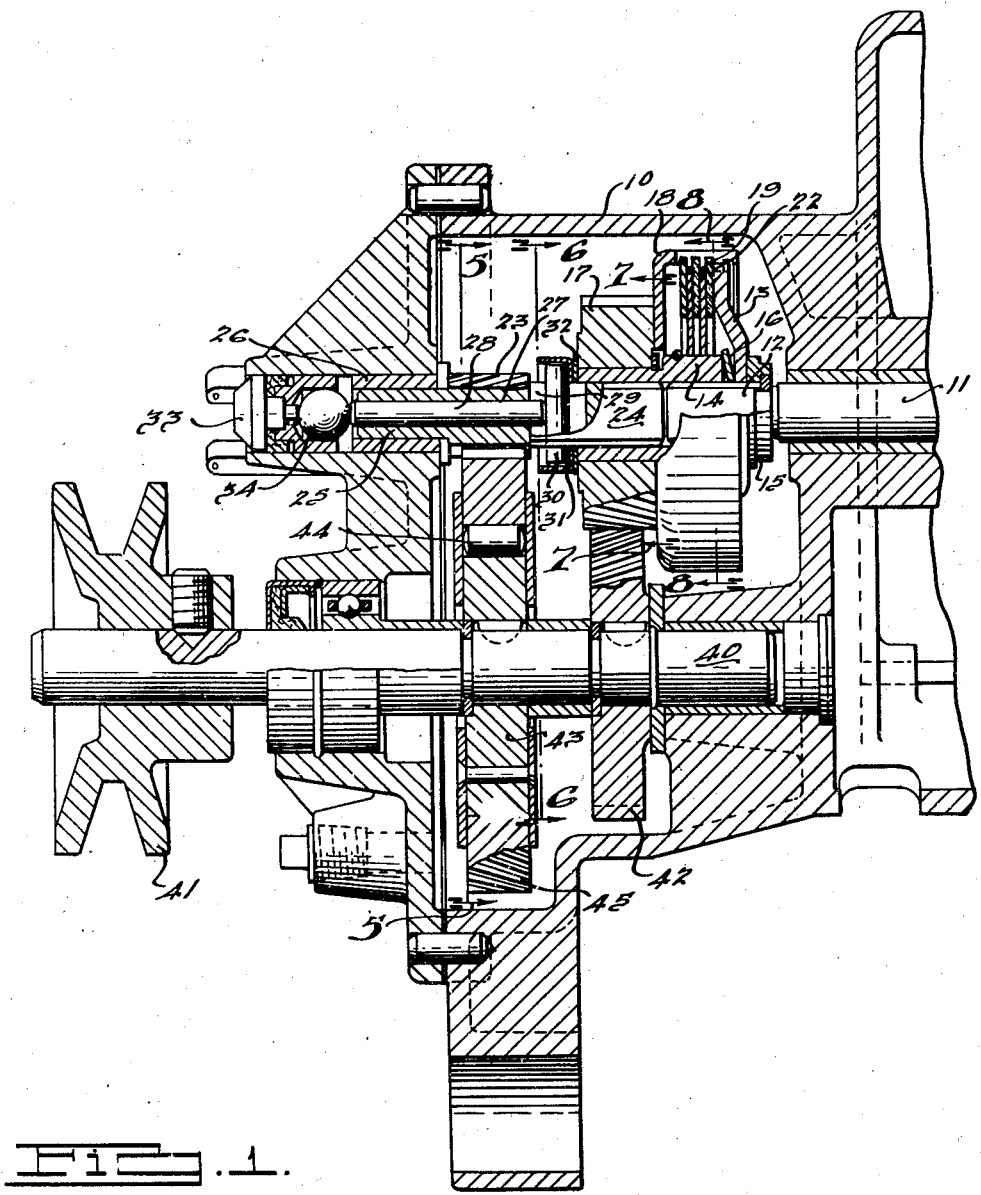
Figure 1 is a vertical sectional view through the transmission and the gearing thereof.

13 are capable of being supported on the end of the driving shaft 11. A gear 17 is mounted for free rotation upon the left hand end of the sleeve 14 as shown in Figure 1. This gear 17 is secured to rotate with a drum-shaped clutch member 18 and carried within this drum-shaped clutch member are a series of clutch plates 19 having their center portions notched as shown at 20 in Figure 8 so that such clutch plates 19 are caused to rotate with the sleeve 14. Between clutch plates 19 clutch disks 22 are provided and because of extensions projecting into notches 22a of the drum-shaped clutch member 18 these disks 22 are therefore required to rotate with the clutch member 18. It is apparent from consideration of the above construction that a movement of the gear 17 and the sleeve 14 toward the right will cause the clutch plates 19 carried by sleeve 14 to be brought into contact with disks 22 carried by clutch member 18 and thereby to cause the gear 17 to be clutched to and secured to rotate with the power shaft 11, whereas if the gear 17 and sleeve 14 do not have pressure exerted against them to produce a movement toward the right as shown in Figure 1, such gear 17 and the drum-shaped clutch member 18 will be free to rotate independently of the sleeve 14 and the shaft 11.

Figures 2, 3:
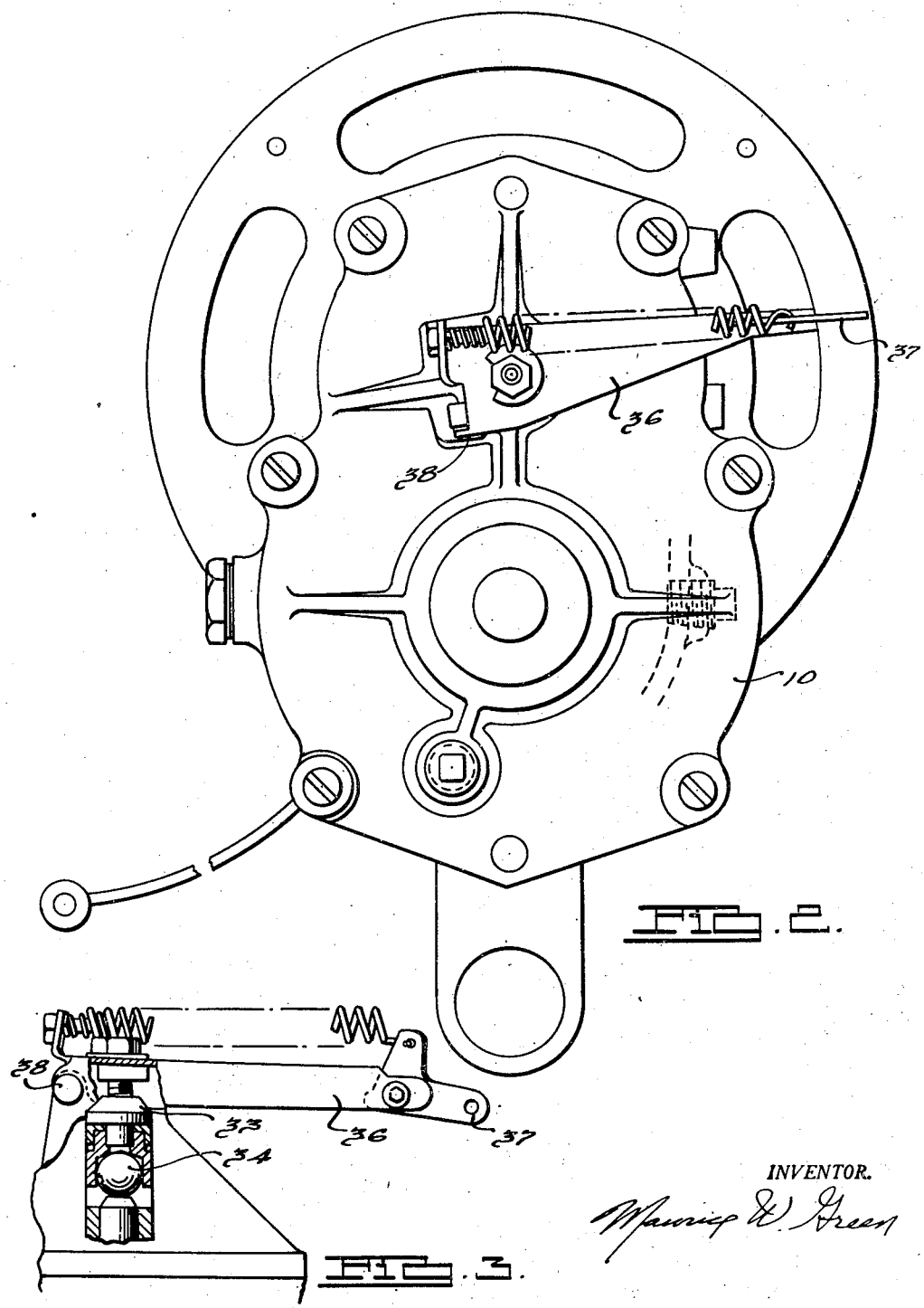
Figure 2 is an end view of the transmission showing the connection of the operating lever.
Figure 3 is a further view of the operating lever.
Figure 4:
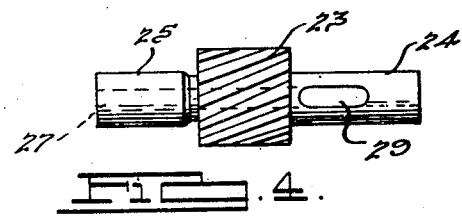
Figure 4 is a plan view of the pinion member and adjacent shaft portions particularly showing the slotted arrangement necessary for operation of the speed-changing unit.

In the left-hand end fo the sleeve 14, also having the same flat sided or other irregular shape, a pinion and shaft member is carried for sliding but non-rotating connection relative to the sleeve. The member which is thus assembled into the end of the sleeve is a pinion and shaft member 23 and a projecting end 24 is of such shape as to fit into the sleeve in such manner as to rotate with the sleeve 14, the member 23 with its pinion and extensions forming what might be termed a sectional shaft portion. The pinion and shaft member 23 (see Figures 1 and 4) has another extending portion 25 shown as extending toward the left from the center pinion portion in Figures 1 and 4. This extending portion 25 is circular in section and serves as a journal for a bearing 26 as shown in Figure 1. The shaft extending portion 25 as well as pinion gear 23 has a central opening 27, shown dotted in Figure 4 and in full lines in Figure 1. This central opening carries an actuating member or pin 28 of such size as to slide axially in the central opening 27. In the right-hand projecting end 24, a cross-slot 29 is provided which meets the opening 27 as shown in Figures 1 and 4. The slot 29 extends entirely across and through the shaft projection 24 so that a pin 30 may be carried in the slot and have limited sliding movement axially of the projecting end 24 as shown. Such pin 30 is held in place by a cup-shaped member 31 which is slipped over the projecting end 24 before its assembly into the sleeve 14. A washer 32 is preferably carried between the cup-shaped member and the end of the sleeve 14 and the gear 17 as shown in Figure 1. For the purpose of actuating the pin 28 from the outer end of shaft extension 25 a plunger 33 is carried in the housing beyond the left-hand end of the bearing 26, which actuating plunger carries a ball 34 of such configuration and size as to abut against the end of the pin 28 extending out from the end of the shaft extension 25. The pin 28 is of such length that it extends through the opening 27 into the slot 29 and into contact with the cross pin 30. Therefore, when the pin 28 is pushed toward the right as shown in Figure 1, the cross pin 30 and cup-shaped member 31 will afford abutment means between gears 23 and 17 to push the gear 17 and the sleeve 14 toward the right against action of spring 16 as viewed in Figure 1 and cause actuation of the clutch members, carried within the drum member 18 previously described, thereby to clutch the gear 17 for rotation with the shaft 11. The pin 28 thus provides an actuating member extending centrally through the pinion gear 23 and sectional shaft portion to actuate the clutch to connect the other gear 17 to the drive shaft. Such sliding movement for actuation of the pin 28 to effect this result is accomplished by movement of the ball 34 by the plunger 33. This plunger 33, as will be evident on inspection of Figure 3, is actuated by a lever 36 which lever is in turn actuated by suitable means such as an electrical solenoid connected to the resiliently mounted end 37 of the lever 36. The lever 36 is pivotally mounted at 38 as shown in Figure 3. From the above description, it is apparent that the actuation of the lever 37 to push the ball 34 to the right as shown in Figure 1 will have the result of clutching the gear 17 to rotate with the driving shaft 11 while a lack of actuation of such lever 36 and consequent loose support of the ball 34 will allow gear 17 to rotate freely relative to the shaft 11 and sleeve 14 and adjacent pinion member 23, the spring 16 acting to push sleeve 14 toward the left in axial sliding movement relative to projection 24.

Figure 5:
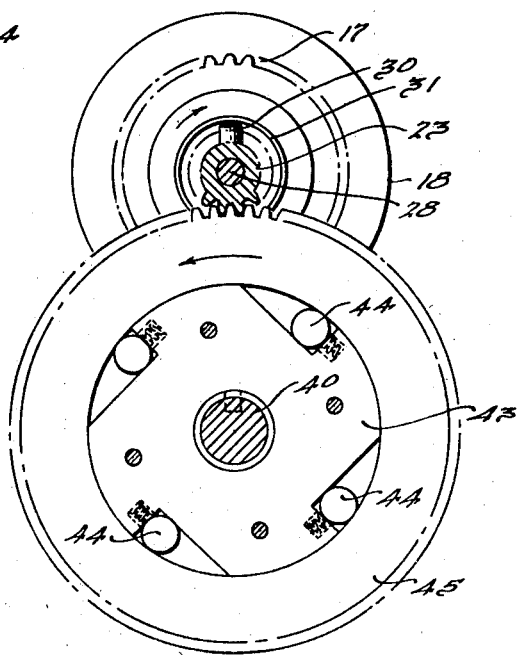
Figure 5 is a view and section taken substantially on the line 5—5 of Figure 1.

The remaining gears of the transmission necessary to effect a two-speed drive are carried on a driven shaft 40 which serves as the output shaft of the transmission and has a pulley 41 shown mounted on its outer projecting end. Mounted on the driven shaft 40 is a gear 42 which is keyed to rotate with the shaft 40 and which meshes with the previously mentioned gear 17. Also keyed to the shaft 40 is an inner-member 43 of a one-way drive connection which inner-member is also keyed to the shaft 40. As shown in Figure 5 this inner-member 43 carries a plurality of rollers 44 in suitable tapered slots and mounted around this one-way drive assembly is a gear member 45, which gear meshes with the previously mentioned pinion 23.

Figure 6:
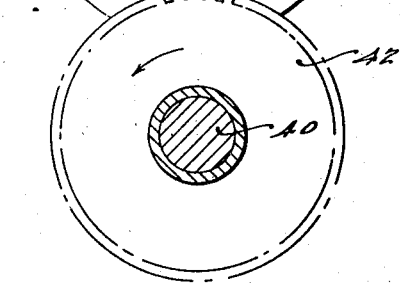
Figure 6 is a view and section taken substantially on the line 6—6 of Figure 1.

The several gears of the transmission above described are preferably of the helical type which will produce an end thrust in one direction or the other depending upon the direction of the helix angle relative to the rotation. The several gears are provided with helix angles which produce end thrust in the direction as follows: The pair of gears 23 and 45 which mesh together, have a helix angle of such that with drive on the shaft 11 and the pinion 23 the end thrust generated will tend to cause the pinion 23 to be pushed toward the left as viewed in Figure 1 when the drive pinion 23 is rotating in a clockwise direction as viewed in Figure 5 and gear 45 thus rotated counterclockwise. However, with the pair of gears 17 and 42 the direction of rotation of the gear 17 being in a clockwise direction as viewed in Figure 6 and the meshing gear 42 in a counterclockwise, the helix angle for these two gears is in a direction such that when power is applied through gear 17 the end thrust will be toward the right as viewed in Figure 1, while if the power is applied through gear 42 as when gear 17 is idle and shaft 40 is driven from pinion 23, the tendency of the component of end thrust created by the helix angle will be to slide the gear 17 endwise toward the left if such gear is freely rotating on the sleeve 14 as it is when the clutch is not actuated.

For tracing the drive through the transmission for the two speeds with the mechanism as shown and previously described, it will first be assumed that the lever 36 is not actuated and the gear 17 therefore, unclutched and free to rotate relative to the sleeve 14. The sectional shaft and pinion 23 will be driven from shaft 11 and such rotation will be in a counterclockwise direction as viewed in Figure 5. Such rotation of the pinion 23 will cause clockwise rotation of the gear 45 as also viewed in Figure 5 and such clockwise rotation as will be apparent on inspection of Figure 5 will cause the one-way drive connection rollers 44 to be forced to the small end of the operating slots and to drive the inner one-way drive member 43 which is in turn connected to the output shaft 40. Therefore, by the above mentioned drive from shaft 11, pinion 23 through gear 45 to the shaft 40 there is provided a gear reduction effected by the pitch diameter ratio between the gear 23 and the gear 45 and the speed will be a so-called low speed of the transmission. During such operation it is apparent on inspection of Figure 1 that the gear 42 will also rotate with the output or driven shaft 40 but will cause idle rotation of the meshing gear 17 which is, as before mentioned, free to rotate on sleeve 14. If it now be assumed that the lever 36 is actuated to push the pin 28 toward the right as shown in Figure 1 to thus also push the cross pin 30 and the adjacent sleeve 14 and gear 17 thereby to clutch said gear to the shaft 11 through clutch 18, then the drive will be from the shaft 11 through the gear 17 and when such gear is clutched to the shaft 11, then the drive will be through the gear 17 to the gear 42 and out through the shaft 40, this drive being effected because of the fact that the rotation imparted by the gear 17 will cause the shaft 40 to rotate at a faster speed than the rotation imparted through the small pinion 23 and gear 45 because of the gear ratio between gears 17 and 42 which are of nearly equal pitch diameter in the mechanism illustrated. This faster rotation imparted to the shaft 40 will cause the one-way drive connection to be released since the tendency will be, because of the higher speed of the shaft 40 over gear 45, to cause the rollers 44 (see Figure 5) to move to the large end of the slot and the result will be an idle rotation of the gear 45 and the pinion 23 without driving connection to shaft 40. The result, therefore, is a substantially higher speed of output shaft 40 than was previously effected when the clutch was not in operation and the drive was through gears 23 and 45.

It is important to the satisfactory operation of this transmission that the previously mentioned end thrust relationship of the gear pairs 23, 45 and 17, 42 be maintained as when the solenoid is actuated to push the pin 28 toward the right in Figure 1 to actuate the clutch the fact that at that time the drive is through the gear pinion 23 to the gear 45 will cause the pinion 23 to be pushed toward the left as viewed in Figure 1, that is in the opposite direction from the sliding of the pin 28 to actuate the clutch. Therefore, it will be unnecessary in the type of transmission here disclosed to slide the pinion 23 against its normal end thrust as the clutch actuating pressure will be applied through the pin 28. Transmissions have been built which utilize the sliding of a pinion similar to 23 for actuating the clutch in place of the pin 28. However, it is considered that the clutch actuation will be more positive and require less force to operate as well as affording less interference with gear drive if the actuation is accomplished by the sliding of the pin without sliding of the pinion as herein disclosed. It is apparent that if the helix angle were oppositely set so that end thrust would be toward the right in Figure 1, there would be a tendency of such end thrust to actuate the clutch by sliding of sectional shaft and pinion 23 which would be detrimental if such thrust were large as it might cause clutch actuation when such result was not desired.

Considering the previously mentioned relation of the helix angle on the gears 17 and 42, it is evident that before the clutch is actuated by movement of the pin 28 that the drive causing end thrust on gear 17 will be from gear 42 to gear 17 and thus will cause the gear to be normally pushed toward the left away from clutch actuation as long as such clutch is out of engagement and such end thrust will tend to keep the clutch out of engagement, together with the spring pressure from the spring 16. However, on sliding movement of the pin 28 toward the right together with the sleeve 14 and the gear 17 and on the taking up of the drive by gear 17 on contact with the clutch, the end thrust on gear 17 will then be in a direction tending to pull the clutch into engagement and in this case the end thrust will, therefore, assist the holding of the clutch in engagement together with the thrust of the pin 28. It is apparent that the end thrust on the gear 17 toward the left during idling movement of such gear before clutch actuation will be relatively small due to the light load carried. Therefore, neither the pinion gear 23 nor the gear 17 will be subjected to axial movement in any material amount during the time that load is being transmitted through such gear. That is the movement of pin 28 makes axial sliding of pinion 12 unnecessary and the end thrust generated causes the pinion to be held in a maximum position in the direction opposite to the clutch operating movement of pin 28. Furthermore, although there is some axial sliding of gear 17 this sliding is of material amount only during idle rotation of such gear and when the clutch is actuated the axial movement is no longer present.

Although the invention has been illustrated by reference to a specific structure found practical for actual operation and use, it is evident and intended that variations may be made without departing from the fundamental principles within the scope of the following claims.

I claim:

1. In a transmission, a drive shaft, a sleeve mounted to rotate with said drive shaft and having limited freedom of axial sliding movement relative to said shaft, a drive gear mounted to rotate relative to said sleeve, a clutch member secured to rotate with said gear, a second clutch member secured to rotate with said drive shaft, a pinion drive gear mounted for rotation with said sleeve and drive shaft and co-axial therewith and having a central opening therethrough, abutment means between said gears movable in a direction to bring said clutch members into engagement to connect said first mentioned gear for rotation with said drive shaft, a spring normally urging said clutch members out of engagement, an actuating member extending through the central opening in said pinion gear for moving said abutment member in a direction to bring said clutch members into engagement.

2. In a transmission, a drive shaft, a sleeve mounted for sliding movement on said drive shaft, a sectional shaft mounted to be carried by said sleeve for rotation therewith and with freedom of limited axial sliding movement relative to said sleeve, a pinion mounted for rotation with said sectional shaft, a gear mounted for rotation around said sleeve, clutch means for connecting said gear to rotate with said drive shaft on axial movement of said sleeve, and actuating means extending through the central portion of said sectional shaft for actuating said clutch from an end of said sectional shaft by movement of said actuating means in one direction axially of said sectional shaft and pinion, and driving teeth on said pinion having an angle of driving contact in a direction to produce an end thrust axially of said pinion and sectional shaft in a direction opposite to the direction of movement of said actuating means producing actuation of said clutch.

3. In a transmission, a drive shaft, a pinion gear mounted for rotation with said drive shaft, a driven shaft, a gear meshing with said pinion and connected to said driven shaft by a one-way drive connection, a second gear mounted to rotate relative to said drive shaft, a gear meshing with said second gear and secured to rotate with said driven shaft, a clutch to connect said freely rotating gear to said drive shaft, and means between said freely rotating gear and said pinion for connecting said gear to the drive shaft, and actuating means extending through the central portion of said pinion for actuating said clutch from a position adjacent the outer end of said pinion.

4. In a transmission, a drive shaft, a gear mounted for rotation with said drive shaft, a second gear mounted on said drive shaft but normally free to rotate relative thereto, clutch means for connecting said last mentioned gear to rotate with said drive shaft, operating means for said clutch comprising a member extending through a central portion of said shaft and said first mentioned gear to actuate said clutch, teeth on said first mentioned gear of such angle relative to the rotation of said drive shaft as to cause end thrust on said gear to tend to move said gear in a direction opposite from movement required to produce actuation of said clutch.

5. In a transmission, a drive shaft, a sectional shaft mounted for rotation with said drive shaft but having freedom of sliding movement axially of said drive shaft, a sleeve connecting said drive shaft and said sectional shaft, a pinion carried by said sectional shaft, a gear mounted for freedom of rotation around said sleeve, clutch means for connecting said gear for rotation with said drive shaft and said sleeve, an operating means for said clutch extending longitudinally through said sectional shaft, teeth on said pinion providing end thrust in a direction opposite to the direction of movement required by said operating means to actuate said clutch.

6. In a transmission, a drive shaft, a pinion mounted co-axially therewith, a sleeve slidably but non-rotatably connected to said shaft and pinion member, a gear freely rotatable on said sleeve, a clutch operable on longitudinal movement of said gear and sleeve, actuating means extending centrally through said pinion member and mounted to cause longitudinal movement of said sleeve and gear necessary for actuating said clutch.

7. In a transmission, a drive shaft, a pinion member shaft, a pinion member mounted coaxially therewith, a sleeve mounted on and slidably but non-rotatably connected to said shaft and pinion member, a gear freely journaled on said sleeve, a clutch for connecting said sleeve and gear actuated by longitudinal axial movement of said sleeve and gear, a pin extending longitudinally through the central axis of said pinion member and mounted for limited longitudinal sliding movement, a second pin mounted across said pinion member shaft and having its ends forming an abutment for producing axial movement of said gear and sleeve thereby to actuate said clutch.

MAURICE W. GREEN.